US007351048B2

(12) United States Patent
Hinzpeter et al.

(10) Patent No.: US 7,351,048 B2
(45) Date of Patent: Apr. 1, 2008

(54) POWDER PRESS

(75) Inventors: Jurgen Hinzpeter, Schwarzenbek (DE); Ingo Schmidt, Schwarzenbek (DE); Andreas Groth, Schwarzenbek (DE); Andreas Teetzen, Schwarzenbek (DE); Thomas Pannewitz, Schwarzenbek (DE); Holger Behns, Barsbuttel (DE)

(73) Assignee: Fette GmbH, Schwarzenbek (DE)

( * ) Notice: Subject to any disclaimer, the term of this patent is extended or adjusted under 35 U.S.C. 154(b) by 292 days.

(21) Appl. No.: 11/058,967

(22) Filed: Feb. 16, 2005

(65) Prior Publication Data

US 2005/0186300 A1 Aug. 25, 2005

(30) Foreign Application Priority Data

Feb. 20, 2004 (DE) ...................... 10 2004 008 322

(51) Int. Cl.
*B22F 3/04* (2006.01)
*B29C 43/58* (2006.01)

(52) U.S. Cl. ........................ 425/78; 425/149; 425/411; 425/419

(58) Field of Classification Search .................. 425/78, 425/138, 141, 149, 150, 346, 349, 354, 355–356, 425/182–183, 419, 411, 403, 407
See application file for complete search history.

(56) References Cited

U.S. PATENT DOCUMENTS 3,890,413 A * 6/1975 Peterson ...................... 425/78
4,184,827 A * 1/1980 von Herrmann et al. ... 425/150
5,145,693 A * 9/1992 Hinzpeter et al. .......... 425/149
6,325,609 B1 * 12/2001 Shimada ...................... 425/140
6,531,090 B2 * 3/2003 Ogawa ......................... 425/78
7,150,617 B1 * 12/2006 Lowell et al. ................ 425/78

FOREIGN PATENT DOCUMENTS

| | | |
|---|---|---|
| DE | 4 209 767 | 6/1993 |
| DE | 197 17 217 | 10/1998 |
| DE | 100 10 671 | 9/2001 |
| DE | 101 42 772 | 3/2003 |

* cited by examiner

*Primary Examiner*—Yogendra N. Gupta
*Assistant Examiner*—Thu Khanh T. Nguyen
(74) *Attorney, Agent, or Firm*—Vidas, Arrett & Steinkraus, P.A.

(57) ABSTRACT

Powder press for the production of pressed articles of powder-shaped pressing material, having the following characteristics: a female mould plate with a least two female moulds or one female mould with at least two female die bores, at least two upper plungers, which co-operate with the female moulds and the female die bores, respectively, hydraulic cylinder for the upper plungers at least two bottom plungers, which co-operate with the female moulds and the female die bores, respectively hydraulic cylinders for the bottom plungers at least one position sensor for the upper plungers, and at least one position sensor for the bottom plungers force sensors for the individual hydraulic cylinders and a controlling means for the hydraulic cylinder or the hydraulic cylinders for the upper plungers and each one controlling means for the hydraulic cylinders for the bottom plungers.

10 Claims, 2 Drawing Sheets

POWDER PRESS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

This invention is related to a powder press for the production of pressed articles from powder-shaped pressing material, according to the patent claim.

It is known to produce moulded articles from hard metal, ceramics, sintered metal or the like with the aid of presses. The powder-shaped or granular metal, respectively, is formed to a formed body with the aid of presses, which is thereafter subjected to a sintering process. A press has an upper plunger and a bottom plunger, which co-operate with a female mould or a female die bore in a female mould plate. The plungers are driven by a suitable power drive, either mechanically or hydraulically via suitable hydraulic cylinders. It is known to arrange the female mould plate fixedly and to move the upper and the bottom plunger, or alternatively to move the female mould plate and to adjust the upper plunger, whereas the bottom plunger remains stationary.

It is essential for a reproducible production of powder pressed articles, that the pressed article receives a homogeneous structure at a predetermined density. Pressed articles with low density shrink more rapid upon sintering than pressed articles with higher density. It can be attempted to minimise density variations by pressing strokes which are differently adjustable for upper and bottom plungers. On the other hand, varying densities can be generated by varying pressing forces in practice, which themselves again are generated even at equal height of pressed articles, e.g. by reason of filling fluctuations, which may reach some percents. Hydraulic presses have the advantage that a relatively deliberately programmable pressing procedure can be achieved. From DE 4 209 767 C1 it is known to measure the pressing force in order to achieve a density which is uniform as much as possible in one batch. Depending on the measured pressing force, a correction is performed via the filling of the consecutive pressed articles thereafter. In this method, the position of the plungers is determined and the corresponding pressing force is determined. The starting-up from a particular position leads to a relatively high moulding precision, but causes varying densities in some cases . If on the other hand the pressing procedure is ended at a predetermined pressing force, there is the risk that the pressed article has varying thicknesses.

From DE 197 17 217 C2 it has become known to establish a desired force/path-diagram (set-point diagram) for one pressing plunger, in dependence of the geometry of the pressed article and the starting material during the compression in advance, and to memorise it. In a computer for the production process, the measured values for the path and the force of the pressing plunger are compared with the set-point curve during the compression. By means of a separately actuated portion of the press plunger or of a separate plunger, the pressure on the pressing material is increased or decreased during the compression phase, as soon as a deviation from the desired curve is detected. In this method, at least two position sensors have to be provided, namely for the at least one pressing plunger and the at least one further pressing plunger. From DE 100 10 671 C2 it has become known to establish a force/power-diagram for a desired pressed article through preceding experiments, according to which the bottom- or upper plunger is shifted during the compression. The follow-up according to the force/power-diagram requires also a control device, as is the case in the method described above.

From DE 1 042 772 C2 it has become known to memorise the value for the energy which is to be delivered by the upper plunger for a particular pressed article of predetermined geometry and dimensions and of predetermined material. Further, as a second value, the overall energy to be delivered by the upper and bottom plunger is memorised. During the compression, the forward feed of the upper plunger is ended when its energy consumption has reached the predetermined first memorised value, and the forward feed of the bottom plunger takes place according to the memorised remaining energy consumption and it is ended when the total energy has reached the second predetermined value. Even to do this, control is necessary.

It is the objective of all the methods, to ascertain with the aid of suitable controlling measures that always the same pressing result is obtained even with powder that varies within one batch.

BRIEF SUMMARY OF THE INVENTION

A production cycle consists of several phases: filling in the material, conducting the plungers together, compacting the pressing material, press keeping time, drawing out the pressed article and its removal. Normally, the removal takes place by an automatic removal system. In order to increase the output performance of the press, it is attempted to shorten the durations of the individual phases. In this respect, there are technological limits which are opposed to the shortening of the cycle duration. The durations for compacting the powder, the press keeping time and the time required for drawing out the pressed article depend from the kind of powder employed and of the geometry of the pressed article. Too short durations of compacting, press-keeping and drawing out result in hairline cracks in the pressed article, which has to be avoided without any fail. For this reason, the output performance of modem powder presses is presently limited to at most 30 pieces per minute.

The present invention is based on the objective to provide a powder press for the production of pressed articles from powder-shaped pressing material by which the output performance can be significantly improved without compromising the pressing accuracy.

In the powder press according to the invention, a fixed or movable female mould plate with a least two female moulds or one female mould with at least two female die bores is provided. In the powder press according to the invention, there are further provided at least two upper plungers, which co-operate with the female moulds or the female die bores, respectively, and which act individually or are mechanically coupled. They are actuated by two or one single hydraulic cylinder, respectively. Further, there are provided at least two bottom plungers, which co-operate with the female moulds and the female die bores, respectively, and which have each an own or a shared drive by a hydraulic cylinder. One or two position sensor(s) are assigned to the upper plungers and one or two position sensor(s) are assigned to the bottom plungers. A force sensor is assigned to the hydraulic cylinders. Finally, a process computer for the powder press according to the invention has at least three controlling means, namely one controlling means for the hydraulic cylinder of the upper or bottom plungers and each one controlling means for the hydraulic cylinders of the bottom or upper plungers.

The algorithm according to which the individual controlling means are working can be expressed in a conventional manner. Thus, an adjustment according to a force/path-diagram or a force/time-diagram or even according to the energy input is possible, for instance. In all the controls, the desired diagram has to be determined with the aid of suitable experiments and measurements in advance, which is followed up in a controlling manner during the actual production.

With the aid of the powder press according to the invention, two or more pressed articles can be formed at the same time, the pressing operations for the individual pressed articles being influenced separately, by which e.g. powder variations and tool tolerances are compensated. The powder press according to the invention thus enables a great pressing accuracy through separately influencing the pressing operations.

The removal of the produced pressed articles by the removal system may take place in one or more operation steps, the removal in one operation step being preferable because of the shorter cycle duration. Through the simultaneous pressing and removing of several pressed articles, the output performance of the press is multiplied according to the number of simultaneously pressed articles, without impairing the pressing accuracy by doing so.

Realisation examples of the invention are clarified in more detail below by means of drawings.

DETAILED DESCRIPTION OF THE INVENTION

Figure 1:
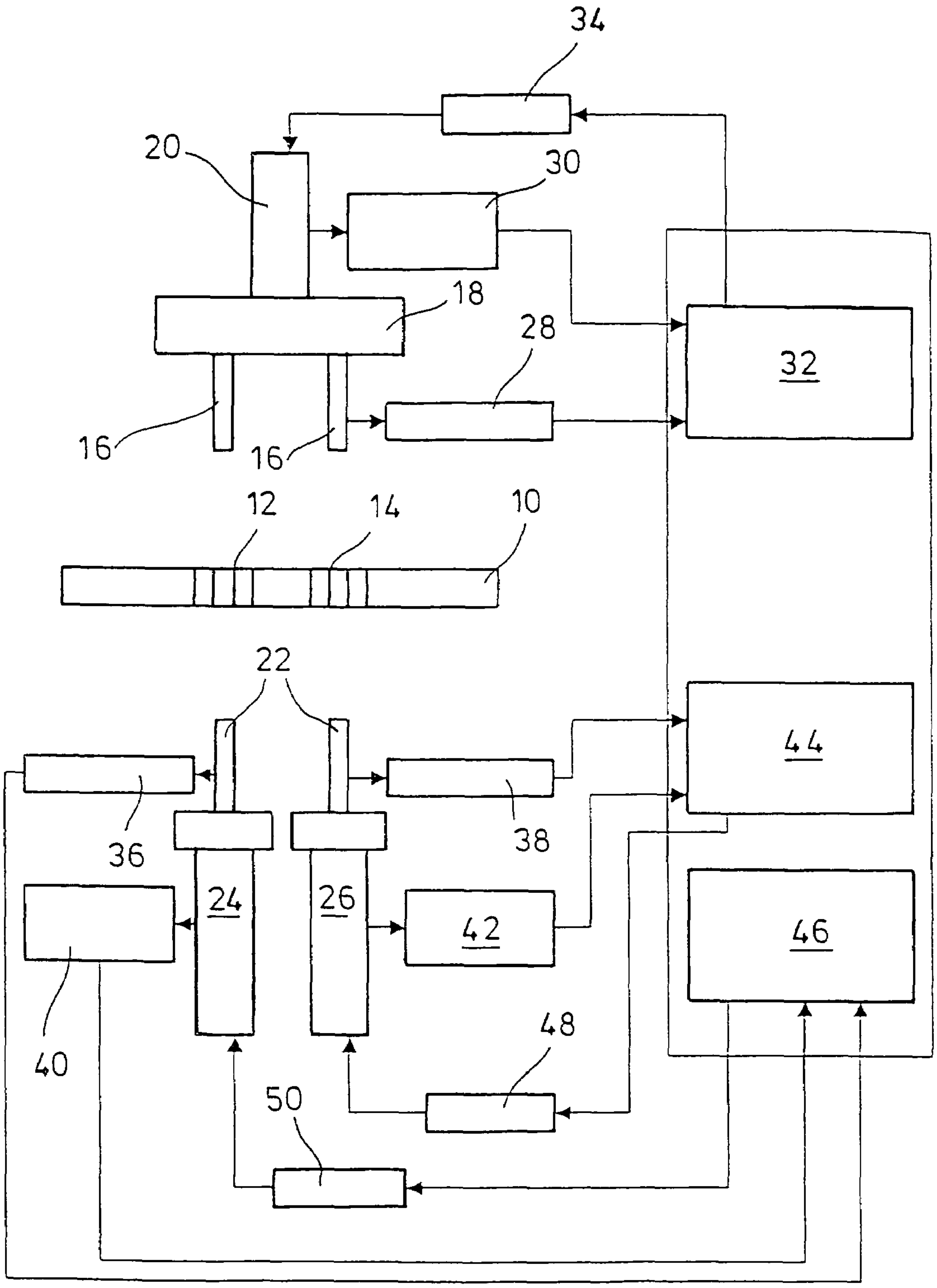
FIG. 1 shows a modular mimic diagram of a first embodiment of a press according to the invention.

While this invention may be embodied in many different forms, there are described in detail herein a specific preferred embodiment of the invention. This description is an exemplification of the principles of the invention and is not intended to limit the invention to the particular embodiment illustrated In the figure, a press for pressing powder-shaped pressing material is schematically represented. It has a stationary female mould plate 10 which contains two female moulds 12, 14 with each one female die bore. Above the female mould plate 10, two upper plungers 16 are arranged, which co-operate with the female moulds 12, 14. The upper plungers 16 are mechanically coupled to each other by a block 18. The block 18 is actuated by a hydraulic cylinder 20.

Two bottom plungers 22 co-operate with the female moulds 12, 14 and are each one actuated by a hydraulic cylinder 24 or 26, respectively. A position sensor 28 is assigned to the upper plungers 16 and a force sensor 30 is assigned to the hydraulic cylinder 20. The actuation of the hydraulic cylinder and that of the upper plungers 16 takes place with the aid of a controlling means 32 in proportion to the values from the force sensor 30 and the position sensor 28, according to a predetermined algorithm, a force/path diagram or a force/time diagram, for instance. A control valve 34 serves as a final actuating element for the hydraulic cylinder 20.

As can be recognised, an individual position sensor 36 or 38 is assigned to each one of the bottom plungers 22, and the force which is applied by the hydraulic cylinders 24, 26 is determined by separate force sensors 40 or 42, respectively. The actuation of the hydraulic cylinders 24, 26 takes place via separate controlling means 44 and 46, respectively, according to the data which are supplied by the position sensors 36, 38 and the force sensors 40, 42, respectively. For instance, the algorithm for the controlling means 44, 46 corresponds to that one according to which the controlling means 32 is working. The correcting variables of the controlling means 44 and 46, respectively, are applied to the hydraulic cylinders 24, 26 by control valves 48 and 50, respectively.

It can be recognised that a high output performance of the press can be achieved with minimal apparatus expenditure, the pressing accuracy being high for each axle, because each axle is controlled separately.

It is to be understood that even the upper plungers 16 can be actuated by separate hydraulic cylinders, as is natural, and by doing so they can also be monitored separately with respect to the forces and other data. Furthermore, it is to be understood that a coupled drive is also possible instead of the separate drive for the bottom plungers 22 through the hydraulic cylinders 24, 26, as has been shown for the upper plungers 16, whilst the upper plungers are separately driven by their own hydraulic cylinders. In each case, the desired objective is achieved to obtain an individual pressing in the female mould bores 12.

Figure 2:
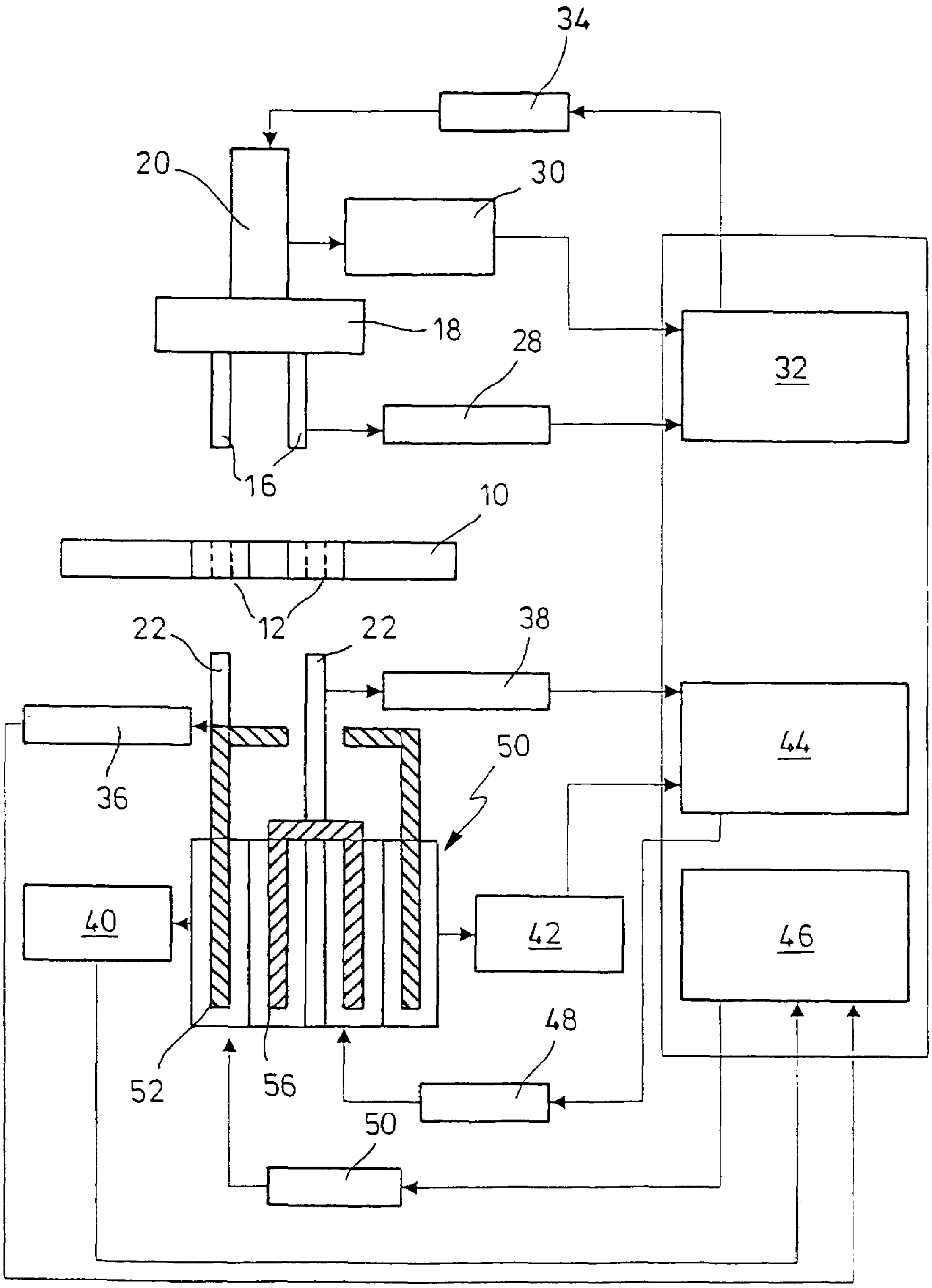
FIG. 2 shows a modular mimic diagram of a second embodiment of a press according to the invention.

Insofar as similar parts are used in the embodiment according to FIG. 2 as are used in FIG. 1, they are assigned with equal reference numerals.

The peculiarity in FIG. 2 is that a hydraulic drive arrangement 50 has two concentrically arranged annular pistons 52, 56 which are guided in corresponding annular cylinders. If conventional hydraulic cylinders are disposed side by side, as is shown in FIG. 1, the distance between the bottom plungers 22 is relatively high. With the aid of an annular arrangement, as is represented in FIG. 2, this distance can be significantly reduced.

It is to be understood that even the upper plungers 16 can be driven by an annular cylinder arrangement too, in addition or alternatively, in which case each annular piston can be detected separately in its position and with respect to the pressing forces.

Finally, it is to be understood that the described arrangement can also be used in presses in which a driven female mould plate is used, whereas the bottom plungers are stationary. In this case it is practical to drive the upper plungers separately and to control their operation separately, whilst the female mould plate is shifted by one or more hydraulic cylinders.

The above disclosure is intended to be illustrative and not exhaustive. This description will suggest many variations and alternatives to one of ordinary skill in this art. All these alternatives and variations are intended to be included within the scope of the claims where the term “comprising” means “including, but not limited to”. Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A powder press for the production of pressed articles of powder-shaped pressing material comprising:

a female mould plate;

at least two upper plungers;

at least one hydraulic cylinder for the upper plungers;

at least one position sensor for the upper plungers;

a controlling means for the upper plungers;

at least two bottom plungers;

a separate hydraulic cylinder for each of the bottom plungers;

at least one position sensor for the bottom plungers;

a controlling means for the bottom plungers; and a force sensor for each of the hydraulic cylinders; wherein:

the female mould plate has at least two female moulds and at least two female die bores, the at least two upper plungers co-operate with the female moulds and the female die bores, respectively, the at least two bottom plungers co-operate with the female moulds and the female die bores, respectively, and each of the separate hydraulic cylinders for the bottom plungers are capable of independent actuation from each other, and are capable of applying different magnitudes of force from each other, and apply the force at different positions and, each of the female die bores are capable of being filled with different amounts of powder.

2. The powder press according to claim 1, characterized in that one item selected from the list consisting of: the upper plungers, the bottom plungers, and any combination thereof, are mechanically coupled and connected to a hydraulic cylinder, and that one position sensor for one item selected from the list consisting of the upper plungers, the bottom plungers, and any combination thereof, is provided.

3. The powder press according to claim 1, characterized in that the bottom plungers are stationary and that the female mould plate is movable in the height direction and is connected to at least one hydraulic cylinder.

4. The powder press according to claim 1, characterized in that the hydraulic cylinders are separate ones for the upper and bottom plunger's, annular cylinders and annular pistons are provided.

5. A powder press for the production of pressed articles of powder-shaped pressing material between upper and lower plungers comprising:

at least two upper plungers constructed and arranged to provide pressing force against powder-shaped pressing material;

at least two bottom plungers constructed and arranged to provide pressing force against powder-shaped pressing material;

a control for each of the plungers;

at least one position sensor for the plungers;

a force sensor for each of the plungers; wherein:

each upper plunger is paired with one bottom plunger to press the powder-shaped pressing material between them; and each of the controls for the bottom plungers are operatively engaged to each of the bottom plungers, are capable of independently actuating the bottom plungers, are capable of applying different magnitudes of force, and apply the force at different positions of the powder-shaped pressing material.

6. The powder press according to claim 5, characterized in that one item selected from the list consisting of: the upper plungers, the bottom plungers, and any combination thereof, are mechanically coupled and connected to a hydraulic cylinder, and that one position sensor for one item selected from the list consisting of the upper plungers, the bottom plungers, and any combination thereof, is provided.

7. The powder press according to claim 5, further comprising a female mould plate characterized in that the bottom plungers are stationary and that the female mould plate is movable in the height direction and is connected to at least one hydraulic cylinder.

8. The powder press according to claim 5 further comprising hydraulic cylinders in mechanical communication with annular pistons and the plungers, characterized in that the hydraulic cylinders are separate ones for the upper and bottom plunger's.

9. The powder press according to claim 5 characterized in that the plunger pairs are capable of pressing different amounts of powder-shaped pressing material.

10. The powder press according to claim 5 characterized in that the plunger pairs are capable of pressing the same amounts of powder-shaped pressing material.

* * * * *